US012447760B2

(12) United States Patent
Serafini et al.

(10) Patent No.: US 12,447,760 B2
(45) Date of Patent: Oct. 21, 2025

(54) METHOD AND APPARATUS FOR PRINTING ON NON-PLANAR BEDS

(71) Applicant: Electronics for Imaging, Inc., Fremont, CA (US)

(72) Inventors: Marco Serafini, Bergamo (IT); Ernesto Propersi Sterbiati, Grassobbio (IT)

(73) Assignee: ELECTRONICS FOR IMAGING, INC., Londonderry, NH (US)

( * ) Notice: Subject to any disclaimer, the term of this patent is extended or adjusted under 35 U.S.C. 154(b) by 264 days.

(21) Appl. No.: 18/058,240

(22) Filed: Nov. 22, 2022

(65) Prior Publication Data

US 2024/0165977 A1 May 23, 2024

(51) Int. Cl.

| | |
|---|---|
| ***B41J 25/316*** | (2006.01) |
| ***B41J 15/08*** | (2006.01) |
| ***B41J 15/16*** | (2006.01) |
| ***B41J 25/00*** | (2006.01) |

(52) U.S. Cl.

CPC ............ *B41J 25/006* (2013.01); *B41J 15/08* (2013.01); *B41J 15/16* (2013.01); *B41J 25/316* (2013.01)

(58) Field of Classification Search

CPC . B41J 25/006; B41J 15/08; B41J 15/16; B41J 25/316

See application file for complete search history.

(56) References Cited

U.S. PATENT DOCUMENTS

| | | | | |
|---|---|---|---|---|
| 2002/0024544 | A1* | 2/2002 | Codos | B41J 11/00212 400/55 |
| 2012/0113199 | A1 | 5/2012 | Edwards | |
| 2017/0106676 | A1 | 4/2017 | Takahashi et al. | |
| 2019/0023009 | A1 | 1/2019 | Yoshimura et al. | |
| 2022/0048298 | A1* | 2/2022 | Sahun Peres | B41J 15/165 |

* cited by examiner

*Primary Examiner* — Yaovi M Ameh
(74) *Attorney, Agent, or Firm* — Perkins Coie LLP

(57) ABSTRACT

A printer includes a convex printing bed that is configured to hold a medium. A printer carriage is operable to swipe back and forth across the medium along a linear axis. A set of printing heads jet ink on the medium. The set of printing heads is secured to and moved along the linear axis by the carriage. At least two rails support the print carriage and to guide the print carriage along the linear axis as the carriage swipes back and forth across the medium. The shape of the convex bed generates tension across the medium such that an increase in width of the medium, due to swelling of the medium when printed, is pulled to the sides by the shape of the convex bed to limit creasing and bulging of the medium.

18 Claims, 5 Drawing Sheets

METHOD AND APPARATUS FOR PRINTING ON NON-PLANAR BEDS

TECHNICAL FIELD

The invention concerns a method and apparatus for printing on non-planar beds.

BACKGROUND

Roll-to-roll printers employ several methods to prevent paper and other media from creasing, bulging, and arching upward in the print area. When a roll of paper or textile medium is loaded in the machine it is dry and void of ceases. The paper is unrolled over the printing area, usually a planar bed, of the machine and ink is jetted onto it. Essentially, the first part of the process has a dry medium which gets wetted upon printing and is usually dried right after, before being rolled again on another roller. Every medium, but especially paper, swells after absorbing the moisture from the ink. The swelling goes both ways, in the process direction, i.e. the direction in which the medium is unrolled and rolled on the machine, and in the cross-process direction, i.e. the width of the medium.

For a section of dry medium with normal width being L, the increase after water absorption is ΔE. The amplitude of ΔE depends on multiple factors such as the characteristics of the medium base material and the coating, the printing ink quantity, AND the printing speed and duration. The base material swells after the water absorbing medium absorbs water. The medium generates irregular vertical arching and bulging in the paper feeding direction because the width of the medium changes across the printing area, from L to L+ΔE. The increase in width is accommodated by local arching (creases) in the medium because the medium cannot slide to the sides to increase its overall width. Creases affect the printing picture quality because the medium is not flat when under the print heads. Furthermore, when the local bulging height is too great, the printing head may be scratched, and picture scrapping may be caused.

A common solution is applying vacuum on the bed of the printing area in an effort to constrain the medium and hold it down. This technique reduces the problem without eliminating it. It is also very dependent on the medium characteristics and requires a constant tweaking of the vacuum parameters. Furthermore, it always results in increased friction with other consequences for the print quality.

Another method is the use of convex rollers (also called banana rollers, bow rollers) both before and after the printing area, to flatten the medium. This creates tension and somewhat reduces the creases after the print before respooling the medium but does not resolve the issue on the printing area, where defects remain due to height difference in the medium.

Another method is the use of pinch rollers before the printing area, to press down the medium on a flat bed. These rollers mitigate the problem, but risk staining the medium as they act on the print side.

The height precision between the printing heads and the medium has an obvious influence on the printing effect. Conventional machine designs try to guarantee the smoothness and planarity of the printing bed on which the medium lies, reduce the distance between the print head and the printing bed, and guarantee parallel movement between the printing bed and a jet printing carriage. The flatness of the printing area allows the paper to crease and arch locally and propagate up to the respooling roller.

SUMMARY

Embodiments of the invention provide a non-flat, arching printing platform printer to apply similar principles to those of the banana roller directly over the printing area. This is done in other printing applications such as label printing where a non-planar printing plane is used to generate lateral forces on the medium and force it to spread. However, to apply the same solution to a roll-to-roll printer, there is need of a method and system to keep a constant gap between the print heads and the medium. Without it, the print heads would be closer to the medium at the center of the printing area and higher on the sides. An arching printing platform creates an orthogonal tension that not only presses the medium against the print platform, but also stretches the medium toward the sides. The length increase after water absorption (ΔE) is thus absorbed and countered by allowing and inducing the medium to stretch to the sides, rather than upward in bulges. To do so requires a method to mitigate height differences between the print medium and the print heads. Differences in height can be millimeters; a non-negligible difference for the industry. In one embodiment, a way to achieve a constant height between print carriage and medium follows the curvature of the print platform with a z-axis motion of the carriage. A few millimeters of precise motion are enough to mirror the print platform along the carriage print axis motion. This allows for straight rails, possibly on different planes, and a simpler machine design/installation. Furthermore, a height sensor may be used to map the curvature of the print platform, adapting the system to different curvatures and print platforms.

In another embodiment, the same system may comprise an additional axis of rotation on the print carriage. This rotation would allow a more precise control of the printing gap between the print heads and the medium, by keeping the print heads perpendicular to the medium on the sides of the curved printing bed. This further axis would be required for high curvatures.

Furthermore, a similar approach could be used with conventional planar beds to adapt the height of the print heads to correct the imprecise planarity of each printing bed. This allows slacker tolerances on the manufacturing of the printing beds, while still guaranteeing a constant gap between print heads and medium.

DETAILED DESCRIPTION

Figure 1:
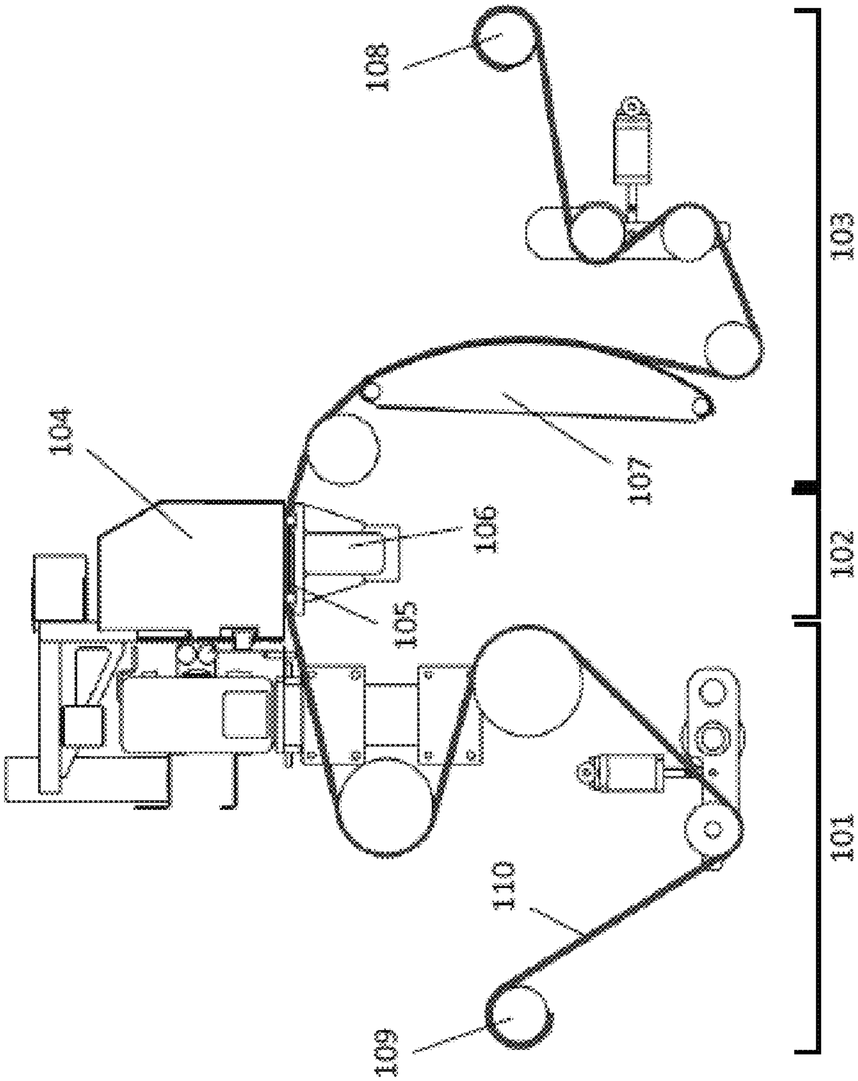
FIG. 1 shows an exemplary path for a substrate through a typical roll-to-roll machine seen from the side.

FIG. 1 shows an exemplary path for substrate 110 through a typical roll-to-roll machine seen from the side. Roller 109 represents the un-spooling roller which feeds the substrate 110 to the printer. Conversely, roller 408 respools the printed and dried substrate that is exiting the machine. Carriage 104 swipes the substrate perpendicular to and above the printing bed 105. The curvature or planarity of the printing bed is provided by the mechanical part 106. Once printed, substrate 110 is dried by component 107 before reaching roller 108.

The substrate can be divided in three portions: a dried portion 101 from the entry of the printer to before being printed; a wet portion 102 from the printing bed 105 to the drying element 107; and a dried printed portion 103 from drying element 107 to the exit roller 108. The geometric and physical differences between these portions of substrate are what cause creasing and bulging on the printing bed.

Figure 2:
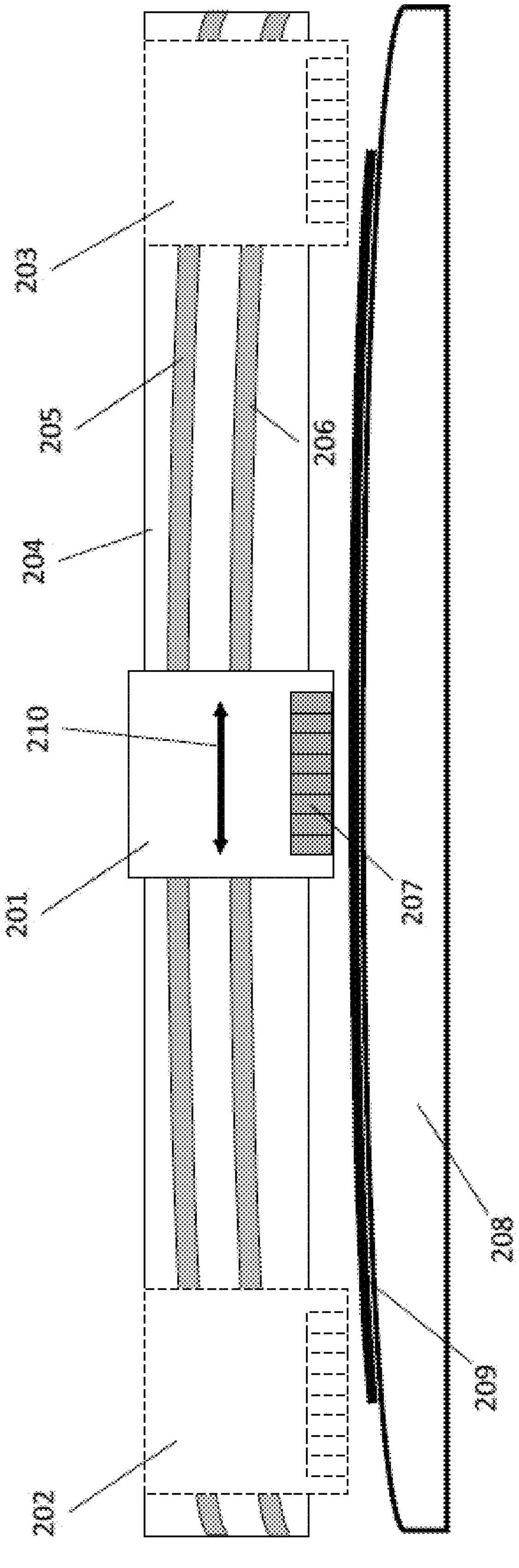
FIG. 2 is a front view of a non-planar bed with curved rails.

In the embodiment of FIG. 2 a curved, in this embodiment convex, printing bed 208 holds the medium 209 seen from the front of the printer. A carriage 201 swipes back and forth reaching the sides of the medium 209 in positions 202 and 203 through the linear axis 210. Carriage 201 holds a set of printing heads 207 for jetting ink on the medium 209. Two (or more) rails 205, 206 hold the print carriage 201 to the body of the machine 204. Tension is generated across the medium 209 by the shape of the curved bed 208. The increase in width, due to the swelling of the medium when printed onto, is pulled to the sides by the shape of the curved bed 208, limiting the creasing and bulging of medium 209.

The curved rails 205, 206 allow carriage 201 to follow the curvature of the curved printing bed 208, thus keeping a constant gap between print heads 207 and medium 209 when carriage 201 reaches the ends of axis 210 in position 202 and 203 (represented by the dotted outline in FIG. 2). The curved rails forgo the need for another motion axis.

Figure 3:
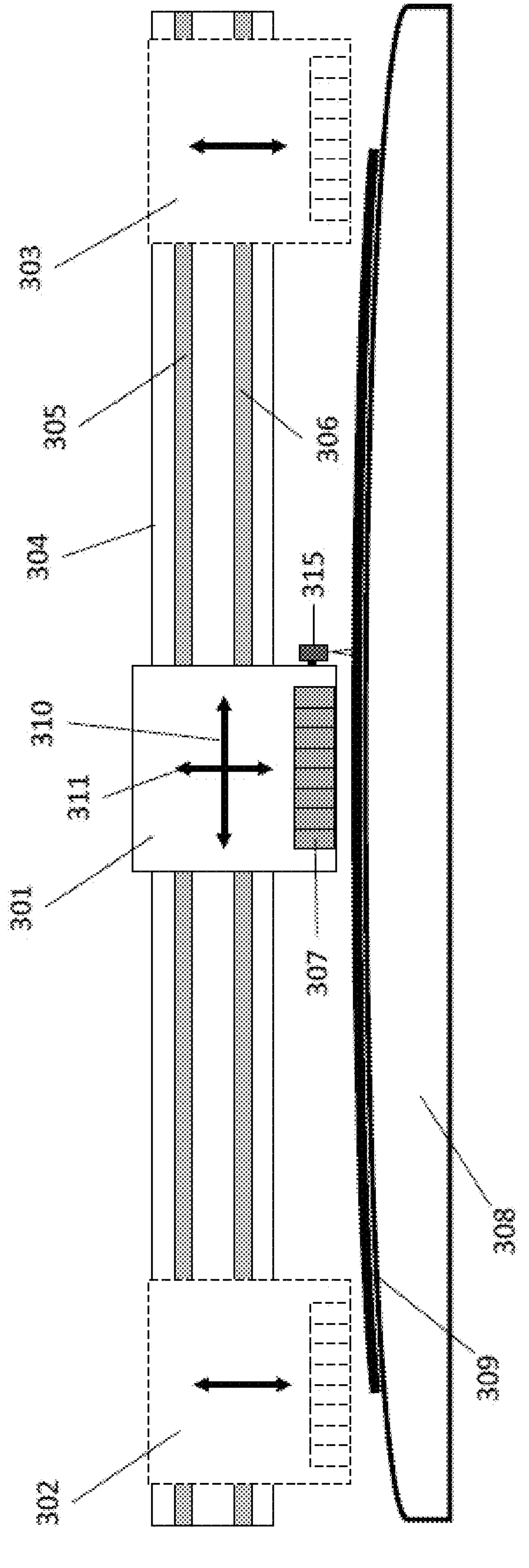
FIG. 3 is the same machine with straight rails and z-axis active compensation.

The embodiment of FIG. 3 provides a simpler design with rectilinear rails 305, 306 and a z-axis 310 to move the print head carrier 301 up and down. Axis 311 allows the carrier 301 to follow the curvature of print bed 308 while moving along axis 310 and keep a constant gap between print heads 307 and substrate 309. Advantages of this approach include:

a) The ability to customize the curvature of print bed 308, by changing bed or via a mechanical system (not shown) to change the curvature, for different applications and substrate, allowing the motion along axis 311 to adapt to different curvatures;
b) Easier manufacturability of linear guides 305, 306 without added curvature; and
c) Less critical tolerances and parallelisms for all mechanical components.

Furthermore, a height sensor 315, 415 may be used to read the curvature of printing bed 308, 408 and automatically adjust the movement along axis 311. The sensor 315, 415 can be optical, for example a laser distance sensor, or mechanical, for example an indicator dial. Said sensor should be mounted on carriage 301 to swipe the entire print bed 308 and record its height. Once sensor 315, 415 has recorded the curvature of print bed 301, the printer electronics can feed this information to axis 411 and 412 to follow said curvature.

Figure 4:
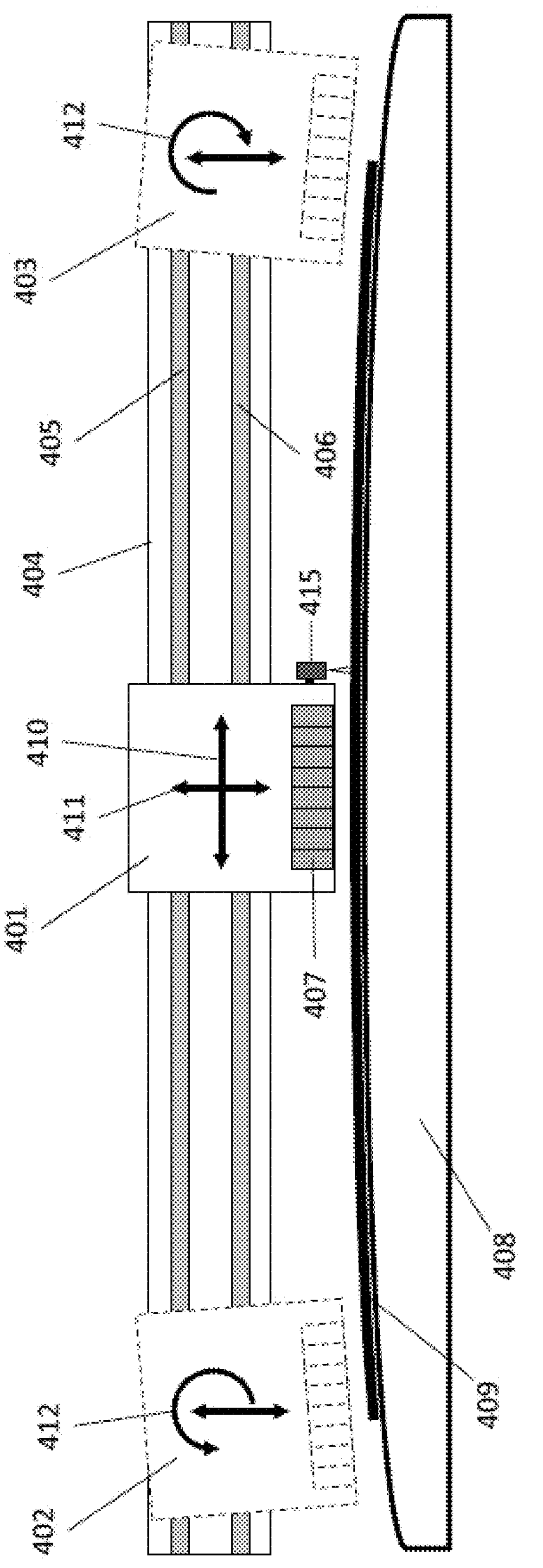
FIG. 4 is a similar machine to that of FIG. 3 with an additional rotation axis on the print carriage.

In the embodiment of FIG. 4 a similar architecture to that of FIG. 3 is proposed with the addition of a further axis 412 to rotate carriage 401. Axis 412 can be achieved with a precise motor like a stepper motor or similar device. The rotation further refines the alignment of print heads 407 along the movement of axis 410 by maintaining a perpendicular alignment to substrate 409. This is particularly useful with printers having a high degree of print bed curvature where carriage 401 would have a big enough relative angle with substrate 409, at the ends of axis 410 (position 402 and 403). The lower the curvature radius, the more convex the print bed, and the wider the angle between the print heads and the substrate. For large enough angles, the print quality would be affected by the lack of perpendicularity between print heads 407 and substrate 409.

Figure 5:
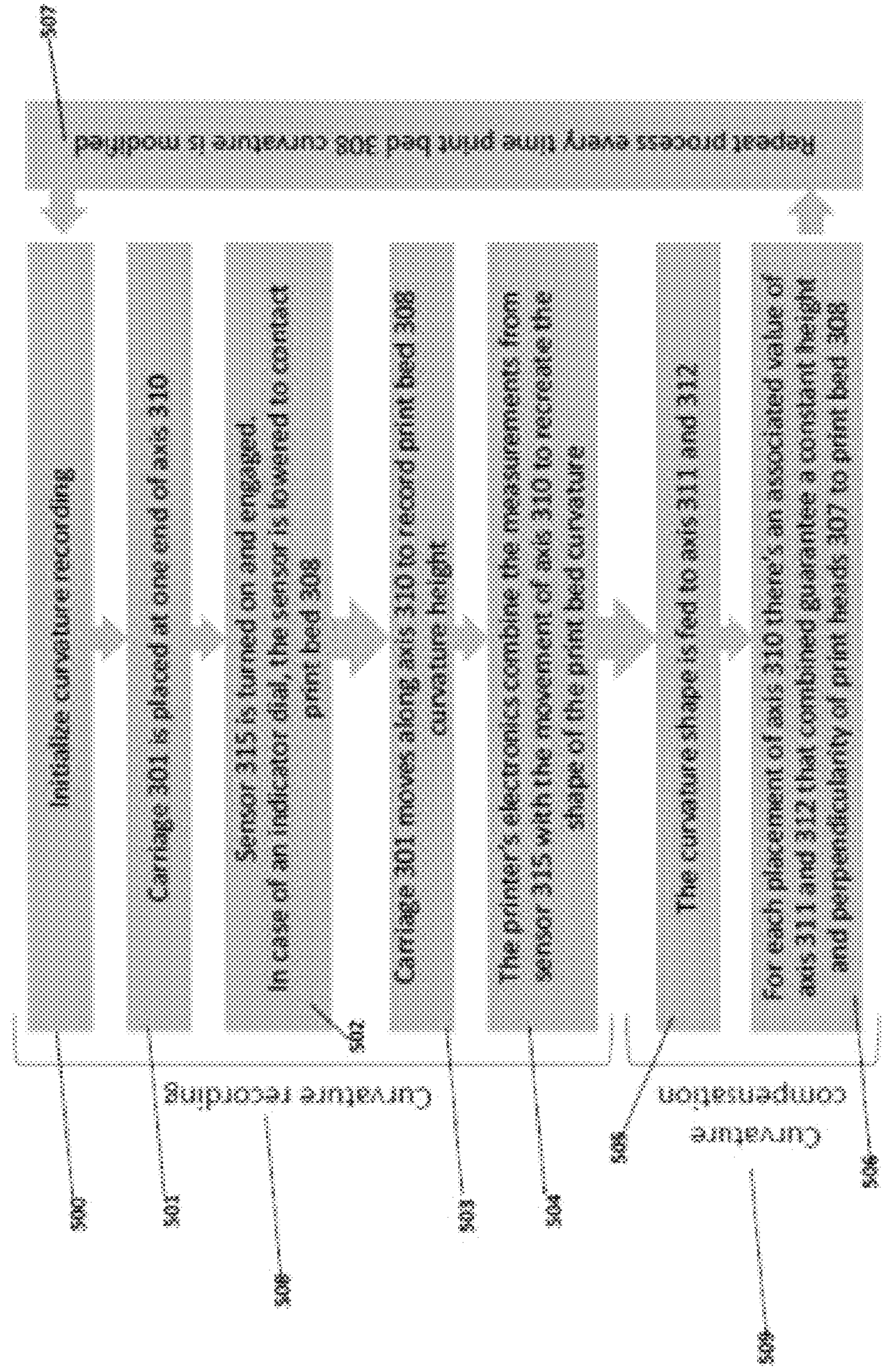
FIG. 5 is an exemplary workflow for curvature recording and compensation.

FIG. 5 is an exemplary workflow for curvature recording and compensation. When the curvature of the printing bed is changed, either by changing the printing bed entirely or by mechanical adjustment means, the height sensor can be used again to align the print carriage 301 with the new curvature. The system may also be used in flat conventional printing beds to correct out-of-tolerance printing beds that were supposed to be perfectly planar.

In FIG. 5, during a curvature recording stage (508) curvature recording is initialized (500). The carriage 301 is placed at one end of the axis 310 (501). The sensor 315 is turned on and engaged (502). In an embodiment that uses an indicator dial, the sensor is lowered to contact the print bed 308. The carriage is then moved along the axis 310 to record the curvature height of the print bed 308 (504). The printer's electronics combine the measurements from the sensor 315 with the movement of the axis 310 to recreate the shape of the print bed curvature (504).

During a curvature compensation stage (509), the curvature shape is fed the axis 311, 312 (509). For each placement of the axis 310 there is an associated value of the axis 311, 312 that combined guarantee a constant height and perpendicularity of the print heads 307 to the print bed 308 (506).

The process of FIG. 5 is repeated every time the print bed 308 curvature is modified (507).

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

The invention claimed is:

1. A printer, comprising:
a curved printing bed configured to hold a medium;
a carriage operable to swipe back and forth across the medium along a linear axis,
wherein the printing bed is curved along the linear axis such that the carriage swipes back and forth across a curved portion of the printing bed;
a set of printing heads for jetting ink on the medium, wherein the set of printing heads is secured to and moved along the linear axis by the carriage; and
at least two rails supporting the print carriage and arranged to guide the print carriage along the linear axis as the carriage swipes back and forth across the medium while the printing heads are jetting ink;
wherein the shape of the curved bed generates tension across the medium; and
wherein the shape of the curved bed pulls to the sides of the curved bed an increase in width of the medium due to swelling of the medium when printed to limit creasing and bulging of the medium.

2. The printer of claim 1, wherein the said at least two rails are curved to guide the carriage along the curvature of the curved printing bed to maintain a constant gap between the print heads and the medium as the carriage traverses the linear axis.

3. The printer of claim 1, further comprising:
a print head carrier attached to said carriage to secure a set of printing heads to the carriage.

4. The printer of claim 3, wherein said at least two rails further comprise rectilinear rails.

5. The printer of claim 1, wherein said carriage is operable along a z-axis to move the print head carrier up and down to maintain a constant gap between the print head and a medium as the carriage traverses the linear axis.

6. The printer of claim 1, further comprising:
a mechanism that adjusts the curvature of the curved print bed for different applications and substrates and that adapts motion of the carriage along the linear axis to that of said adjusted curvature.

7. The printer of claim 5, further comprising:
a height sensor configured to read the curvature of the curved print bed and automatically adjust movement of the carriage along the linear axis to track the curvature of the curved print bed.

8. The printer of claim 6, further comprising:
a height sensor configured to align the print carriage with a new curvature when the curvature of the curved print bed is adjusted.

9. The printer of claim 1, further comprising:
a mechanism that rotates the carriage about a rotational axis to refine alignment of print heads as they are swiped across the medium by the carriage along the linear axis to maintain perpendicular alignment of the print heads to the substrate.

10. A printing method, comprising:
passing a medium along a curved printing bed;
swiping a carriage back and forth across the medium along a linear axis, wherein the printing bed is curved along the linear axis such that the carriage swipes back and forth across a curved portion of the printing bed;
jetting ink on the medium with a set of printing heads, wherein the set of printing heads is secured to and moved along the linear axis by the carriage while the printing heads are jetting ink; and
supporting the print carriage are at least two rails that are arranged to guide the print carriage along the linear axis as the carriage swipes back and forth across the medium;
wherein the shape of the curved bed generates tension across the medium; and
wherein the shape of the curved bed pulls to the sides of the curved bed an increase in width of the medium due to swelling of the medium when printed to limit creasing and bulging of the medium.

11. The method of claim 10, further comprising:
guiding the carriage along the curvature of the curved printing bed with said at least two rails to maintain a constant gap between the print heads and the medium as the carriage traverses the linear axis.

12. The method of claim 10, further comprising:
using a print head carrier attached to said carriage to secure a set of printing heads to the carriage.

13. The method of claim 12, wherein said at least two rails further comprise rectilinear rails.

14. The method of claim 10, further comprising:
operating said carriage along a z-axis to move the print head carrier up and down to maintain a constant gap between the print head and a substrate as the carriage traverses the linear axis.

15. The method of claim 10, further comprising:
adjusting the curvature of the curved print bed for different applications and substrates; and
adapting motion of the carriage along the linear axis to that of said adjusted curvature.

16. The method of claim 14, further comprising:
reading the curvature of the curved print bed with a height sensor; and
automatically adjusting movement of the carriage along the linear axis to track the curvature of the curved print bed.

17. The method of claim 15, further comprising:
using a height sensor to align the print carriage with a new curvature when the curvature of the curved print bed is adjusted.

18. The method of claim 10, further comprising:
rotating the carriage about a rotational axis to refine alignment of the print heads as they are swiped across the medium by the carriage along the linear axis to maintain perpendicular alignment of the print heads to the substrate.

* * * * *